(12) United States Patent
Daniels et al.

(10) Patent No.: US 8,043,048 B2
(45) Date of Patent: Oct. 25, 2011

(54) SYSTEMS AND METHODS FOR MONITORING A STRUCTURAL HEALTH OF A WIND TURBINE

(75) Inventors: Jeffrey Michael Daniels, Schenectady, NY (US); Dinesh Kumar Annadurai, Dindugal (IN); Satish Vemuri, Bangalore (IN)

(73) Assignee: General Electric Company, Schenectady, NY (US)

( * ) Notice: Subject to any disclaimer, the term of this patent is extended or adjusted under 35 U.S.C. 154(b) by 2 days.

(21) Appl. No.: 12/756,857

(22) Filed: Apr. 8, 2010

(65) Prior Publication Data
US 2011/0135468 A1 Jun. 9, 2011

(51) Int. Cl.
*F01B 25/26* (2006.01)
*F03D 7/04* (2006.01)

(52) U.S. Cl. .............................. 415/118; 416/38; 416/61

(58) Field of Classification Search .................... 415/15, 415/118; 416/30, 35, 38, 61
See application file for complete search history.

(56) References Cited

U.S. PATENT DOCUMENTS

| | | | |
|---|---|---|---|
| 4,441,369 A | 4/1984 | Lessard et al. | |
| 4,495,587 A | 1/1985 | Plante et al. | |
| 5,628,319 A | 5/1997 | Koch et al. | |
| 5,675,085 A | 10/1997 | Hayashi et al. | |
| 5,952,836 A * | 9/1999 | Haake | 324/718 |
| 6,571,634 B1 | 6/2003 | Bazarov et al. | |
| 6,859,763 B2 | 2/2005 | Van Polen | |
| 7,299,697 B2 | 11/2007 | Siddu et al. | |
| 7,464,596 B2 | 12/2008 | Bui et al. | |
| 7,508,971 B2 | 3/2009 | Vaccaro et al. | |
| 7,617,732 B2 | 11/2009 | Bui et al. | |
| 7,626,692 B2 | 12/2009 | Engelbart et al. | |
| 2006/0140761 A1* | 6/2006 | LeMieux | 416/61 |
| 2009/0068014 A1* | 3/2009 | Enevoldsen et al. | 416/61 |
| 2010/0004878 A1 | 1/2010 | Volanthen et al. | |
| 2011/0020122 A1* | 1/2011 | Parthasarathy et al. | 416/61 |

FOREIGN PATENT DOCUMENTS

WO 2008068761 A2 6/2008

* cited by examiner

*Primary Examiner* — Nathaniel Wiehe
(74) *Attorney, Agent, or Firm* — James McGinness, Esq.; Armstrong Teasdale LLP

(57) ABSTRACT

A method for monitoring a structural health of a wind turbine. The method includes transmitting, from a sensor to a controller, at least one monitoring signal indicative of a structural discontinuity, the sensor operatively coupled to a structural component of the wind turbine. A first notification signal is transmitted from the controller to a user computing device upon receiving the monitoring signal.

16 Claims, 8 Drawing Sheets

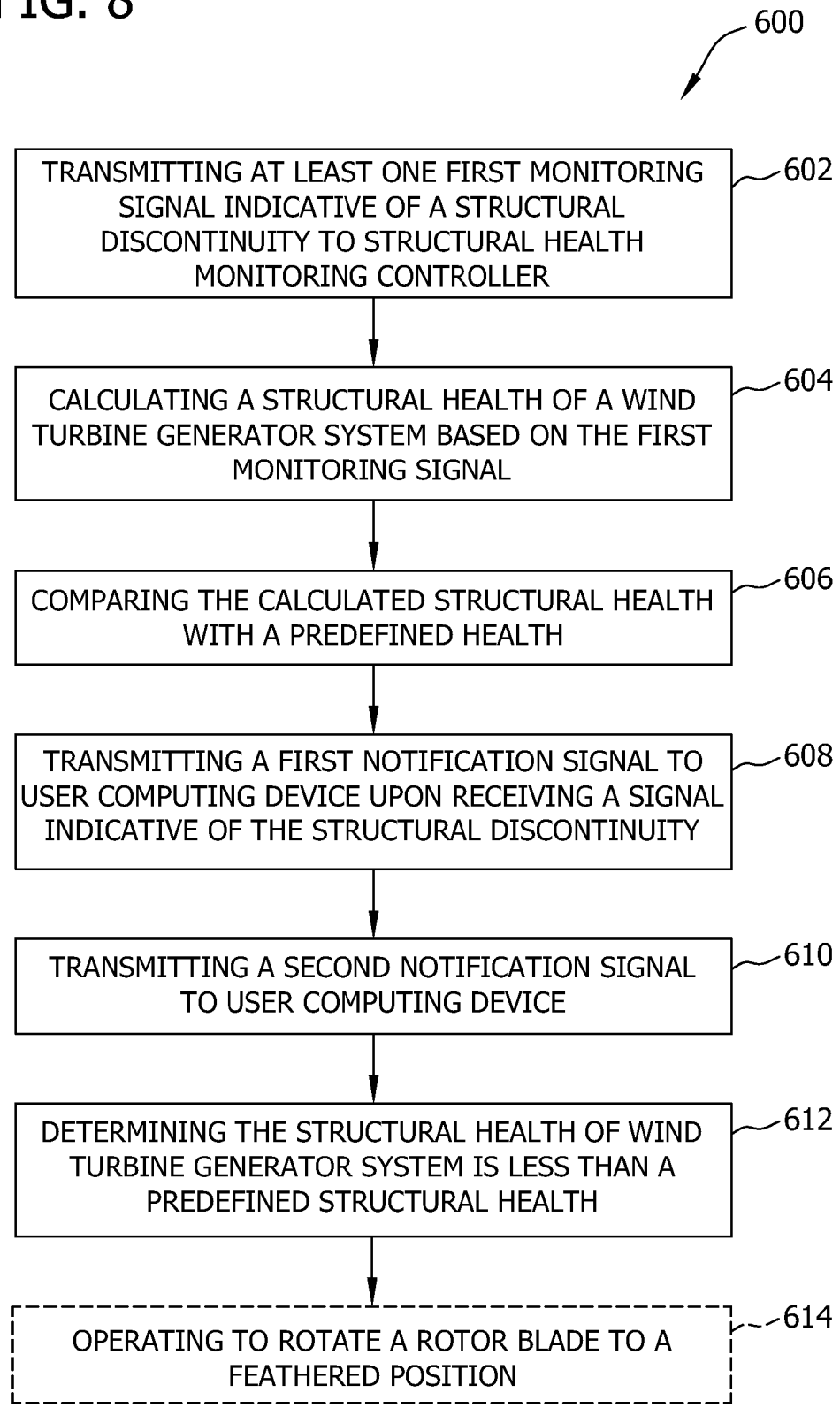

SYSTEMS AND METHODS FOR MONITORING A STRUCTURAL HEALTH OF A WIND TURBINE

BACKGROUND OF THE INVENTION

The subject matter described herein relates generally to systems and methods for monitoring a structural health of a wind turbine system, and more particularly, to a structural health monitoring system configured to monitor a structural health of a structural component of the wind turbine.

At least some known wind turbines include a nacelle fixed atop a tower. The nacelle includes a rotor assembly coupled to a generator through a shaft. In known rotor assemblies, a plurality of blades extend from a rotor. The blades are oriented such that wind passing over the blades turns the rotor and rotates the shaft, thereby driving the generator to generate electricity. Known wind turbines are generally subjected to operational detriments from environmental elements, such as wind shear, extreme temperatures, icing, oceanic waves, as well as internal friction, and general mechanical wear. Operational detriments may eventually cause suboptimal performance of the wind turbine.

At least some known methods of monitoring wind turbines detect operational detriments indirectly by detecting symptoms, such as a decreased power output and/or inoperability, or a decreased wind turbine operating performance. Moreover, because many potential causes exist for such symptoms, determining the root cause of a symptom requires manual inspection by a service technician, introducing undesirable delay and expense before the root cause can be addressed.

At least some known wind turbines include a generator frame including a main frame or a "bedplate" and a generator support frame or a "rear frame" portion that is cantilevered from the bedplate. Known generator frames may be subjected to stresses that cause fatigue cracking and/or failure, particularly at the joint between the bedplate and the rear frame portion. Conventional methods for monitoring some known generator frames include manual inspection, which may be infrequent, expensive, and time consuming.

BRIEF DESCRIPTION OF THE INVENTION

In one aspect, a method for monitoring a structural health of a wind turbine is provided. The method includes transmitting, from a sensor to a controller, at least one monitoring signal indicative of a structural discontinuity, the sensor operatively coupled to a structural component of the wind turbine. A first notification signal is transmitted from the controller to a user computing device upon receiving the monitoring signal.

In another aspect, a structural health monitoring system for use with a wind turbine is provided. The structural health monitoring system includes at least one sensor mountable with respect to a structural component of the wind turbine and configured to sense a structural discontinuity formed within the structural component. The sensor is further configured to transmit at least one monitoring signal indicative of the structural discontinuity. A controller is communicatively coupled to the sensor for receiving the monitoring signal from the sensor. The controller is configured to determine a structural health of the wind turbine based on the received signal.

In yet another aspect, a wind turbine is provided. The wind turbine includes a tower, a nacelle coupled to the tower, a generator positioned within the nacelle, a rotor rotatably coupled to the generator, and a structural health monitoring system operatively coupled to a structural component of the wind turbine. The structural health monitoring system includes at least one sensor mountable with respect to the structural component. The sensor is configured to sense a structural discontinuity formed within the structural component and transmit at least one monitoring signal indicative of the structural discontinuity. A controller is communicatively coupled to the sensor for receiving the monitoring signal from the sensor. The controller is configured to determine a structural health of the wind turbine based on the received signal.

BRIEF DESCRIPTION OF THE DRAWINGS

FIG. 8 is a flow chart illustrating an exemplary method for operating a structural health monitoring system for use with the wind turbine generator system shown in FIG. 1.

DETAILED DESCRIPTION OF THE INVENTION

The embodiments described herein facilitate monitoring the structural health of a wind turbine. More specifically, the embodiments described herein include a structural health monitoring system that facilitates detecting structural discontinuities within the wind turbine. In addition, the structural health monitoring system facilitates determining the structural health of the wind turbine based on the structural discontinuity and operating the wind turbine to a safety operation upon determining that the structural health of the wind turbine system is different than a predefined structural health. As used herein, the term "structural discontinuity" refers to a displacement of material within a structural component and/or a separation of two or more structural components. For example, a structural discontinuity may be one or more of a crack, a displaced joint, a joint separation, a fracture, a deformation band, and/or compression band. As used herein, the term "structural health" refers to the operation of a wind turbine structural component with respect to one or more operating parameters of the structural component.

Figure 1:
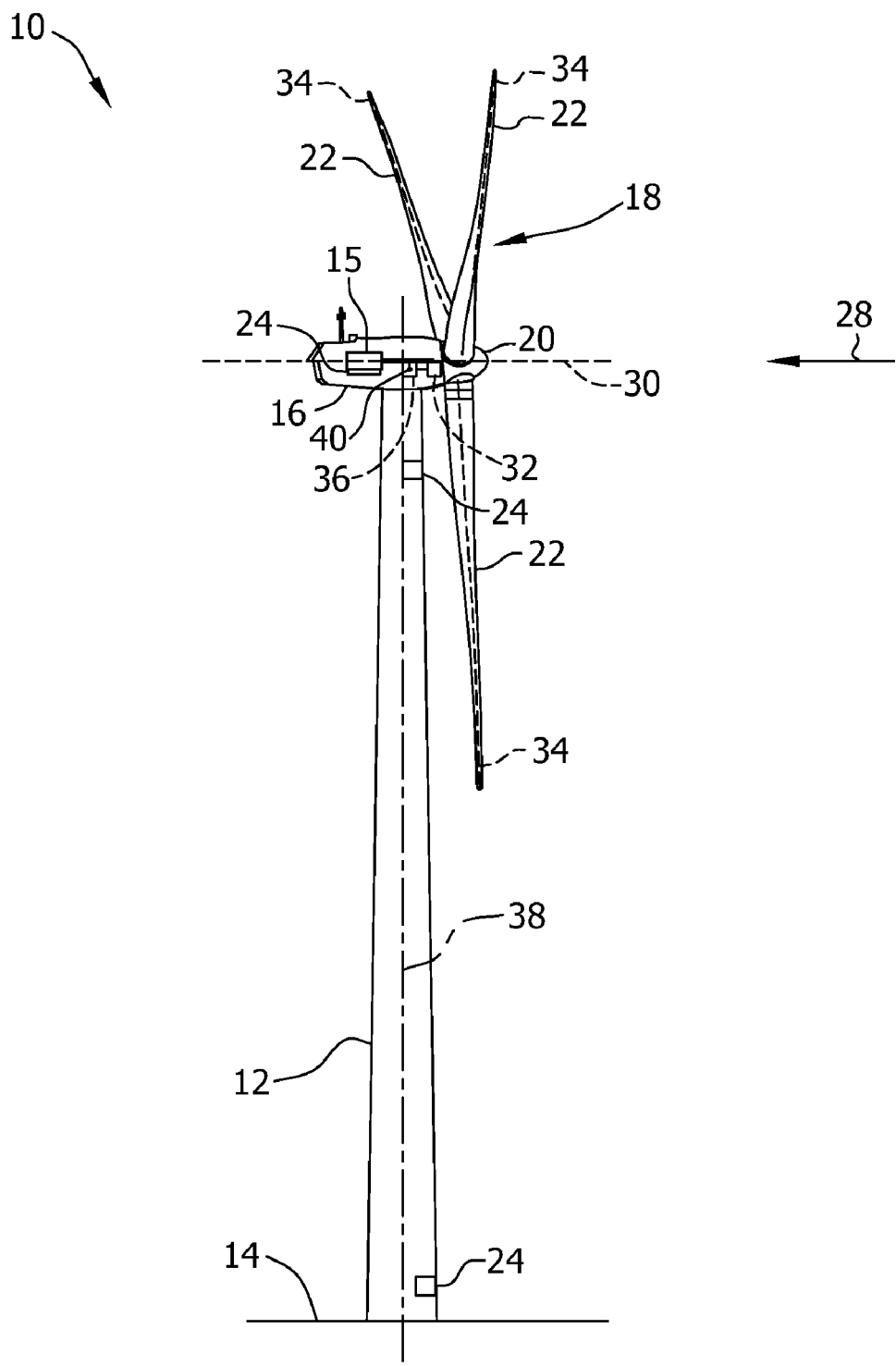
FIG. 1 is a perspective view of an exemplary wind turbine generator system.

FIG. 1 is a perspective view of an exemplary wind turbine generator system 10. In the exemplary embodiment, wind turbine generator system 10 is a horizontal-axis wind turbine. Alternatively, wind turbine generator system 10 may be a vertical-axis wind turbine. In the exemplary embodiment, wind turbine generator system 10 includes a tower 12 that extends from a support surface 14, a nacelle 16 mounted on tower 12, a generator 15 positioned within nacelle 16, and a rotor 18 that is rotatably coupled to generator 15. Rotor 18 includes a rotatable hub 20 and at least one rotor blade 22 coupled to and extending outward from hub 20. In the exemplary embodiment, rotor 18 includes three rotor blades 22. In an alternative embodiment, rotor 18 includes more or less than three rotor blades 22. Wind turbine generator system 10 further includes a structural health monitoring system 24. In the exemplary embodiment, structural health monitoring system 24 is positioned within nacelle 16 and operatively coupled to generator 15, rotor 18, and/or hub 20. In addition, or alternatively, structural health monitoring system 24 is operatively coupled to tower 12. Structural health monitoring system 24 may be operatively coupled to any structural component of wind turbine generator system 10 that may be subjected to fatigue cycles and/or operational wear that may result in the occurrence of structural discontinuities. In the exemplary embodiment, tower 12 is fabricated from tubular steel to define a cavity (not shown in FIG. 1) that extends between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. In the exemplary embodiment, rotor blades 22 have a length ranging from about 30 meters (m) (99 feet (ft)) to about 120 m (394 ft). Alternatively, rotor blades 22 may have any suitable length that enables wind turbine generator system 10 to function as described herein. For example, other non-limiting examples of blade lengths include 10 m or less, 20 m, 37 m, or a length that is greater than 120 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine generator system 10 by adjusting an angular position of at least one rotor blade 22 relative to wind vectors. During operation of wind turbine generator system 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine generator system 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
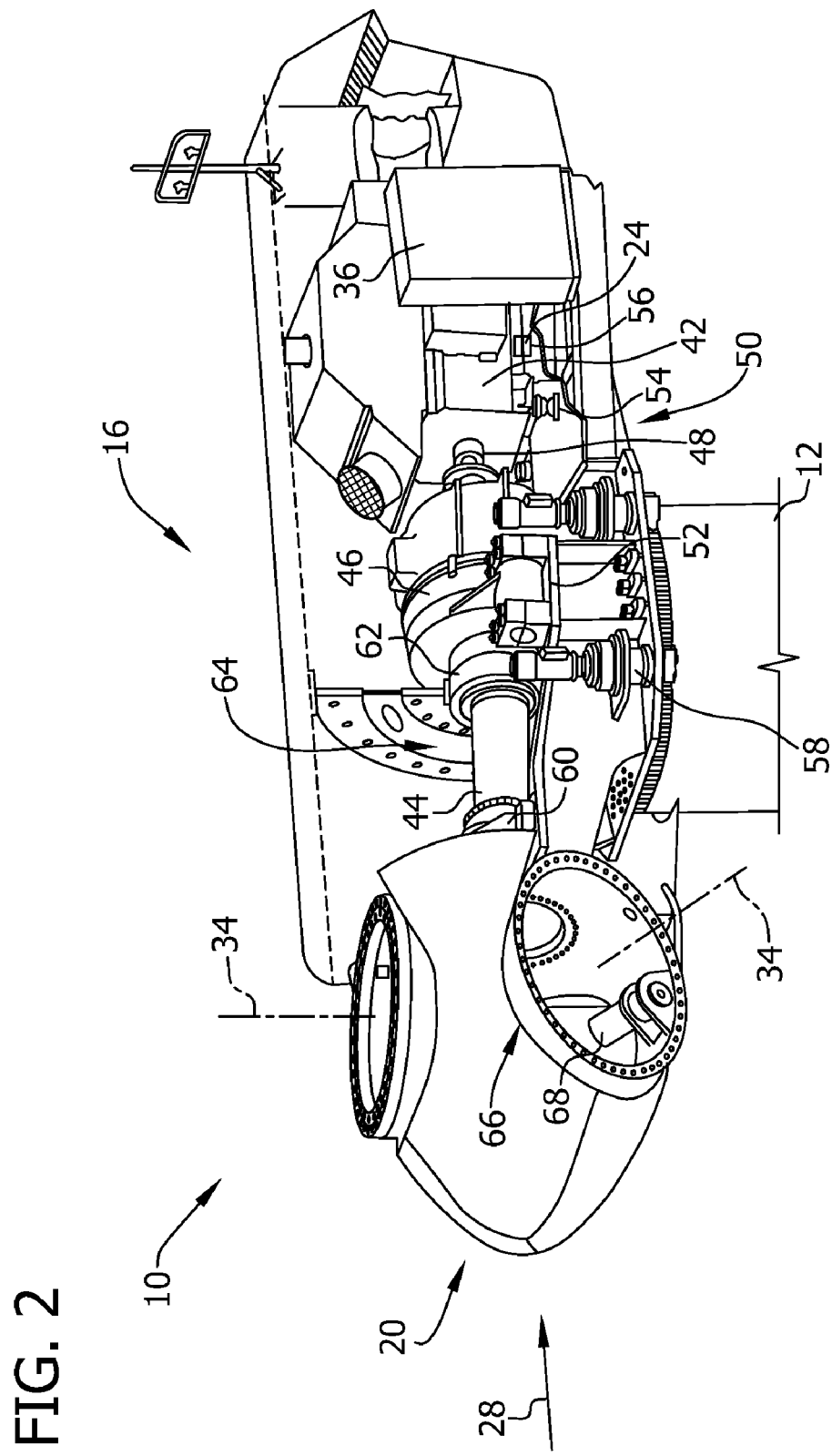
FIG. 2 is an enlarged sectional view of a portion of the wind turbine generator system shown in FIG. 1.

FIG. 2 is an enlarged sectional view of a portion of wind turbine generator system 10. In the exemplary embodiment, wind turbine generator system 10 includes nacelle 16 and hub 20 that is rotatably coupled to nacelle 16. More specifically, hub 20 is rotatably coupled to an electric generator 42 positioned within nacelle 16 by a rotor shaft 44 (sometimes referred to as either a main shaft or a low speed shaft), a gearbox 46, and a high speed shaft 48. Rotation of rotor shaft 44 rotatably drives gearbox 46 that subsequently drives high speed shaft 48. High speed shaft 48 rotatably drives generator 42 to facilitate production of electrical power by generator 42. In the exemplary embodiment, gearbox 46 utilizes a dual path geometry to drive high speed shaft 48. Alternatively, rotor shaft 44 is coupled directly to generator 42. Gearbox 46 and generator 42 are supported by generator support assembly 50. Generator support assembly 50 includes a main support frame or bedplate 52 and a generator frame or rear frame portion 54. In the exemplary embodiment, structural health monitoring system 24 is coupled to one of main support frame 52 and generator frame 54. More specifically, structural health monitoring system 24 includes at least one sensor 56 operatively coupled to main support frame 52 and/or generator frame 54 for sensing structural discontinuities within generator support assembly 50. In an alternative embodiment, sensor 56 is operatively coupled to tower 12, hub 20, and/or nacelle 16 for sensing structural discontinuities within wind turbine generator system 10.

Nacelle 16 also includes a yaw drive mechanism 58 that may be used to rotate nacelle 16 and hub 20 on yaw axis 38 (shown in FIG. 1) to control the perspective of rotor blades 22 with respect to direction 28 of the wind. In the exemplary embodiment, nacelle 16 also includes a main forward support bearing 60 and a main shaft support bearing 62. Forward support bearing 60 and main shaft support bearing 62 facilitate radial support and alignment of rotor shaft 44. Forward support bearing 60 is coupled to rotor shaft 44 near hub 20. Main shaft support bearing 62 is positioned on rotor shaft 44 near gearbox 46 and/or generator 42. Nacelle 16 may include any number of support bearings that enable wind turbine generator system 10 to function as described herein. Rotor shaft 44, generator 42, gearbox 46, high speed shaft 48, and any associated fastening and/or support device including, but not limited to, main support frame 52 and/or generator frame 54, and forward support bearing 60 and main shaft support bearing 62, are sometimes referred to as a drive train 64. In one embodiment, structural health monitoring system 24 is coupled to drive train 64 for sensing structural discontinuities within drive train 64.

In the exemplary embodiment, hub 20 includes a pitch assembly 66 that includes one or more pitch drive systems 68. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

Figure 3:
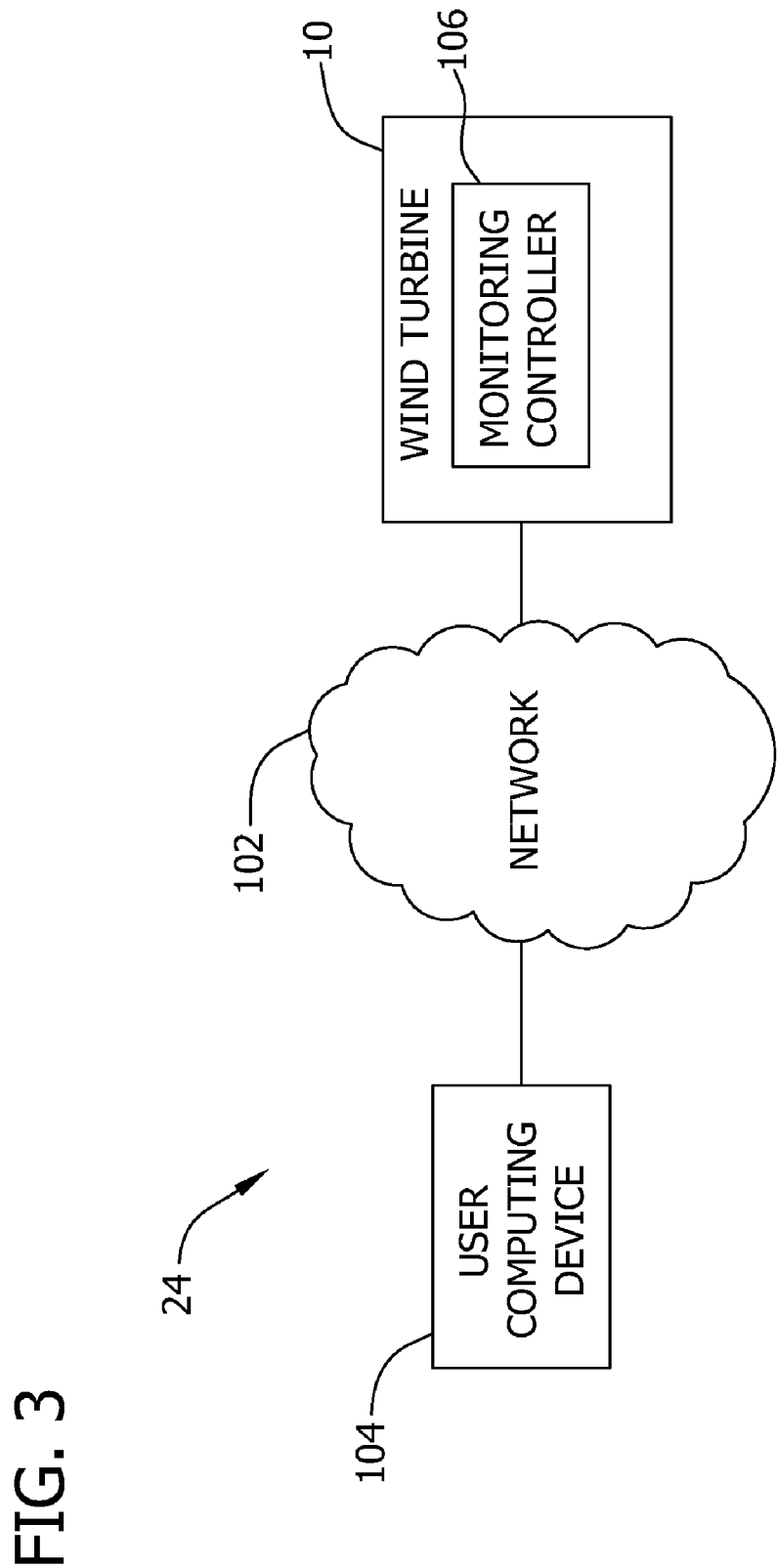
FIG. 3 is a block diagram of an exemplary structural health monitoring system suitable for monitoring the wind turbine generator system shown in FIG. 1.

FIG. 3 is a block diagram of an exemplary structural health monitoring system 24 for monitoring a structural health of wind turbine generator system 10. Structural health monitoring system 24 includes a network 102. For example, network 102 may include, without limitation, the Internet, a local area network (LAN), a wide area network (WAN), a wireless LAN (WLAN), a mesh network, and/or a virtual private network (VPN). A user computing device 104 and one or more structural health monitoring controllers 106 are configured to be communicatively coupled to each other via network 102. User computing device 104 and structural health monitoring controller 106 communicate with each other and/or network 102 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11 (n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

As described in greater detail below in reference to FIG. 4 and FIG. 5, each of user computing device 104 and structural health monitoring controller 106 includes a processor. Each of user computing device 104 and structural health monitoring controller 106 is configurable to perform the operations described herein by programming the corresponding processor. For example, a processor may be programmed by encoding an operation as one or more executable instructions and providing the executable instructions to the processor in a memory area coupled to the processor. A memory area may include, without limitation, one or more random access memory (RAM) devices, one or more storage devices, and/or one or more computer readable media.

Figure 4:
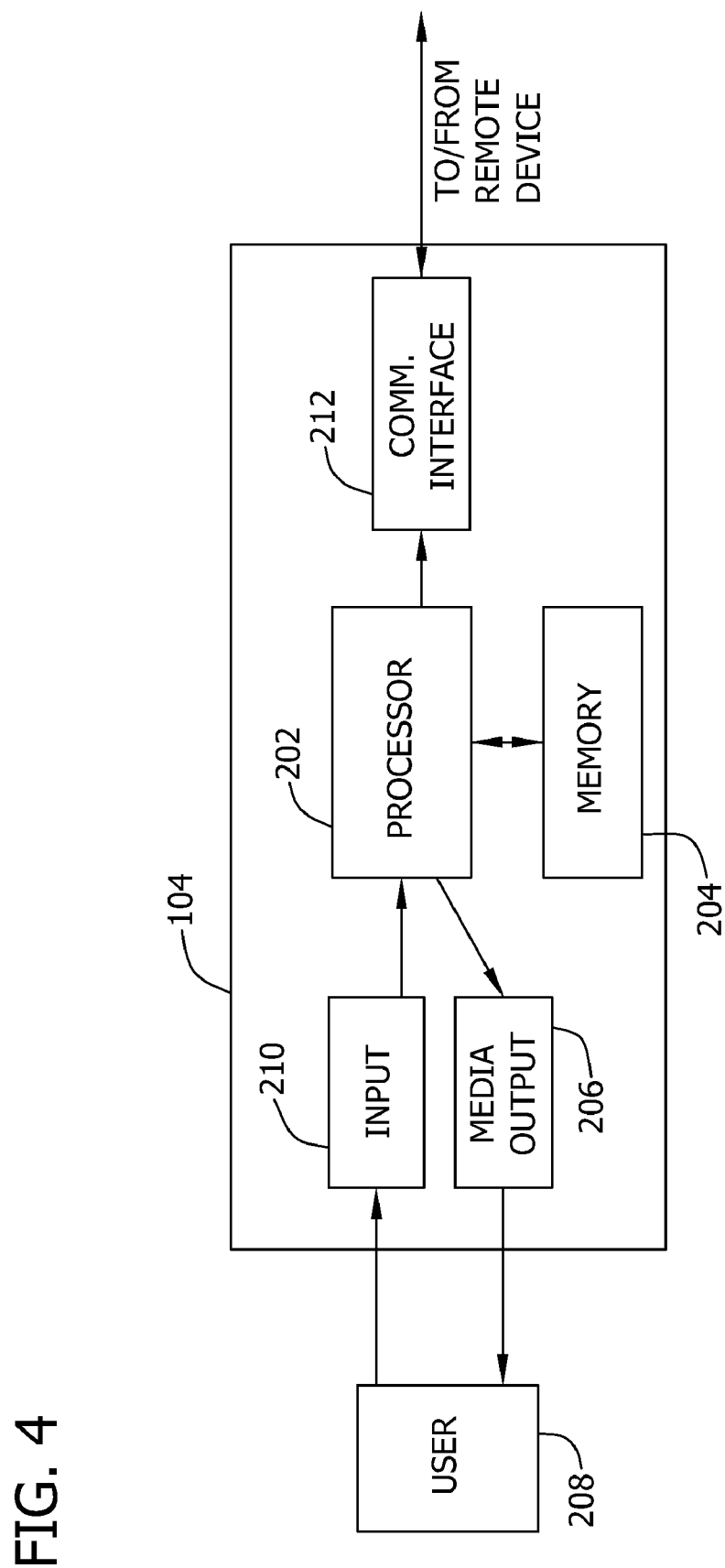
FIG. 4 is a block diagram of an exemplary user computing device suitable for use with the structural health monitoring system shown in FIG. 3.

FIG. 4 is a block diagram illustrating an exemplary user computing device 104 for use with structural health monitoring system 24. User computing device 104 includes a processor 202 for executing instructions. In some embodiments, executable instructions are stored in a memory area 204. Processor 202 may include one or more processing units (e.g., in a multi-core configuration). Memory area 204 is any device allowing information, such as executable instructions and/or other data, to be stored and retrieved.

User computing device 104 also includes at least one media output component 206 for presenting information to a user 208. Media output component 206 is any component capable of conveying information to user 208. Media output component 206 may include, without limitation, a display device (e.g., a liquid crystal display (LCD), organic light emitting diode (OLED) display, or "electronic ink" display) or an audio output device (e.g., a speaker or headphones).

In some embodiments, user computing device 104 includes an input device 210 for receiving input from user 208. Input device 210 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 206 and input device 210. User computing device 104 also includes a communication interface 212, which is configured to be communicatively coupled to network 102 and/or structural health monitoring system 24.

Figure 5:
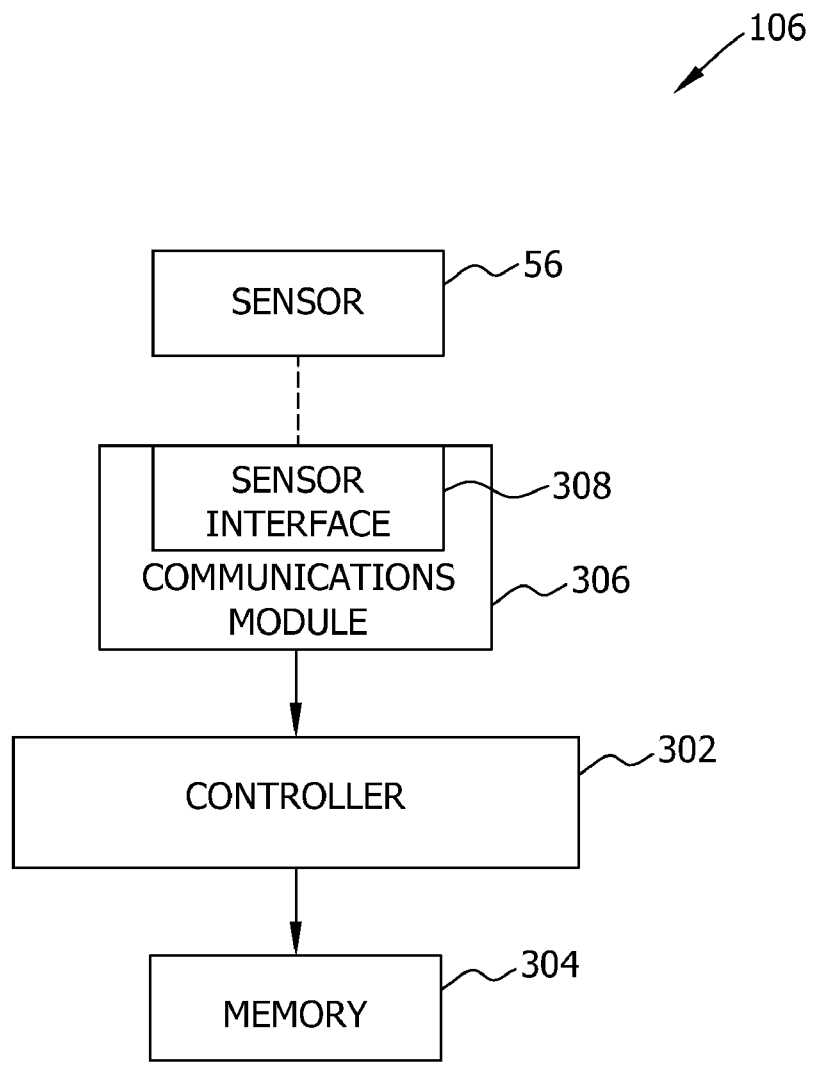
FIG. 5 is a block diagram of an exemplary structural health monitoring controller suitable for use with the structural health monitoring system shown in FIG. 3.

FIG. 5 is a block diagram of an exemplary structural health monitoring controller 106. In the exemplary embodiment, structural health monitoring controller 106 includes a controller 302, a memory 304, and a communications module 306. Communications module 306 includes a sensor interface 308 that facilitates enabling controller 302 to communicate with sensor 56 mounted at any suitable location on or within, or outside wind turbine generator system 10. In one embodiment, sensor interface 308 includes an analog-to-digital converter that converts an analog voltage signal generated by sensor 56 to a multi-bit digital signal usable by controller 302. In alternative embodiments, communications module 306 may include any suitable wired and/or wireless communications device that facilitates transmitting signals to and/or receiving signals from any device located on or within, or outside wind turbine generator system 10 and/or remotely from wind turbine generator system 10. In the exemplary embodiment, memory 304 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 304 for use by controller 302 in controlling wind turbine generator system 10, as described below.

In the exemplary embodiment, controller 302 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 302 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, sensor 56 is communicatively coupled to controller 302 across any suitable wired and/or wireless communication medium via sensor interface 308 of communications module 306 to facilitate enabling sensor 56 to transmit signals to and/or receive signals from structural health monitoring controller 106. In the exemplary embodiment, sensor 56 continuously senses structural discontinuities formed within generator support assembly 50 (shown in FIG. 2) and sensor 56 continuously transmits signals indicative of sensed structural discontinuities to controller 302 in real-time. In one embodiment, controller 302 may be configured to continuously receive and monitor the signals transmitted by sensor 56. In an alternative embodiment, controller 302 may not continuously receive and/or monitor the signals transmitted by sensor 56 but, rather, may be configured to iteratively request signals from sensor 56 at defined time intervals. In certain embodiments, controller 302 and/or sensor 56 may transmit signals to and/or receive signals from one another at any suitable time interval.

Figure 6:
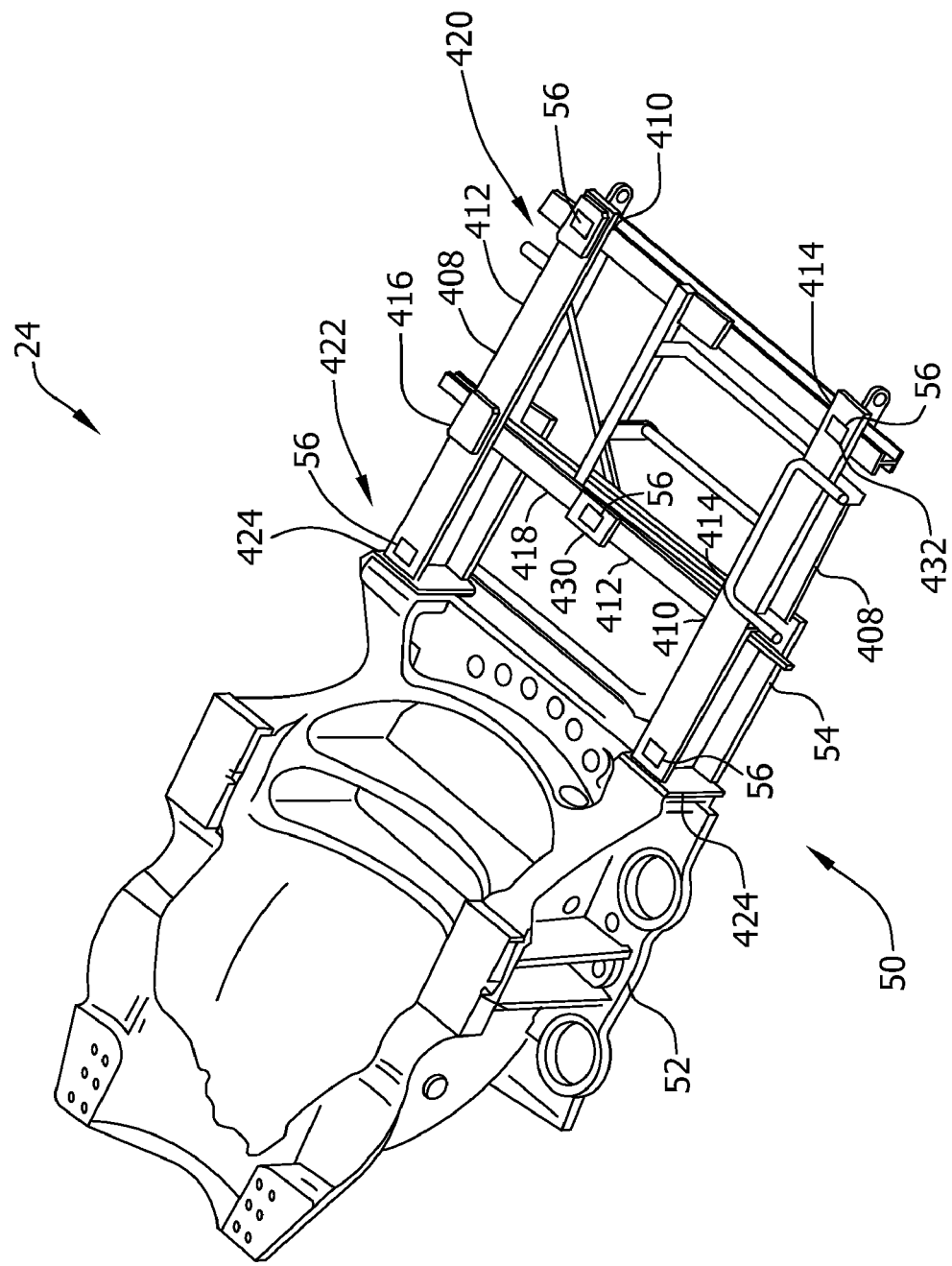
FIG. 6 is a perspective view of an exemplary structural health monitoring system suitable for use the wind turbine generator system shown in FIG. 1.

FIG. 6 is a perspective view of an exemplary structural health monitoring system 24 mounted with respect to a generator support assembly 50. Components shown in FIG. 2 are labeled with the same reference numbers in FIG. 6. In the exemplary embodiment, generator support assembly 50 includes bedplate 52 and rear frame portion 54 that is cantilevered from bedplate 52. Generator support assembly 50 includes a plurality of beams 408 suitably coupled at joints 410. Alternatively, generator support assembly 50 may have any suitable frame configuration including a single, contiguous unit or more than two units. In the exemplary embodiment, rear frame portion 54 includes a plurality of support beams 412 that are coupled at a plurality of joints 414 with a plurality of suitable welds and/or coupling mechanisms. In one embodiment, rear frame portion 54 includes at least one support member 416 extending outward from bedplate 52, and at least one support cross-member 418 extending from support member 416. Each support member 416 includes a first end 420 and a second end 422. In the exemplary embodiment, second end 422 is coupled to bedplate 52 at a joint 424. Generator support assembly 50 may, under certain conditions, be subject to high stresses that can cause fatigue cracking and/or failure, particularly at joint 424 between bedplate 52 and rear frame portion 54. During operation of wind turbine generator system 10, a structural discontinuity may form within generator support assembly 50 at or near joint 424 or any other location within generator support assembly 50.

In the exemplary embodiment, sensor 56 is coupled to generator support assembly 50 for sensing a structural discontinuity within generator support assembly 50. More specifically, sensor 56 is coupled to bedplate 52 and/or rear frame portion 54. In one embodiment, sensor 56 is coupled to rear frame portion 54 at or near joint 424. In another embodiment, one or more sensors 56 are coupled to one or more support beams 412 at or near respective joint 414. In a further embodiment, sensors 56 are coupled to first end 420 and second end 422 of support member 416, and to a middle portion 430 of support cross-member 418. In the exemplary embodiment, sensors 56 include at least one ultrasonic sensor 432. In other embodiments, sensors 56 may include any suitable sensor that enables structural health monitoring system 24 to function as described herein. Alternatively, any suitable number of sensors 56 may be mounted in any suitable location within nacelle 16, within tower 12, external to nacelle 16, and/or external to tower 12 to enable structural health monitoring system 24 to function as described herein.

During operation of wind turbine generator system 10, controller 302 is configured to receive signals indicative of a structural discontinuity from sensor 56. Controller 302 is configured to associate a structural discontinuity value (i.e., a value indicative of a magnitude and/or a direction of the structural discontinuity) with each received signal. After associating a structural discontinuity value with each received signal, controller 302 is configured to calculate a structural health of wind turbine generator system 10 using at least one of the structural discontinuity values associated with the sensed structural discontinuity, and to compare the calculated structural health with a predefined structural health of wind turbine generator system 10. In the exemplary embodiment, controller 302 is further configured to transmit a first notification signal to user computing device 104 (shown in FIG. 4) upon receiving a signal indicative of a structural discontinuity from sensor 56. User computing device 104 is configured to display a first notification to user 208 with media output component 206. In one embodiment, controller 302 is configured to transmit a second notification signal to user computing device 104 upon determining that the structural health of wind turbine generator system 10 is less than the predefined structural health. User computing device 104 is configured to display a second notification to user 208 with media output component 206 upon receiving the second notification signal from controller 302. In an alternative embodiment, controller 302 is configured to operate wind turbine generator system 10 to a safety operation upon determining that the structural health of wind turbine generator system 10 is less than the predefined structural health. In the alternative embodiment, safety operations include, for example, facilitating reducing a vibration of generator support assembly 50, reducing a rotational speed of rotor 18, increasing a rotational speed of rotor 18, reducing an electrical resistance of generator 42 imparted on rotor shaft 44, and/or reducing a structural stress imparted onto drive train 64, tower 12, nacelle 16, and/or hub 20. In another embodiment, controller 302 is configured to control at least one pitch drive system 68 in response to a determined structural health of wind turbine generator system 10 to facilitate reducing the rotational speed of rotor 18. In one embodiment, controller 302 may be configured to control pitch drive system 68 in response to a determined structural health of wind turbine generator system 10 to move rotor blade 22 to a feathered position to slow a rotation of rotor 18.

Figure 7:
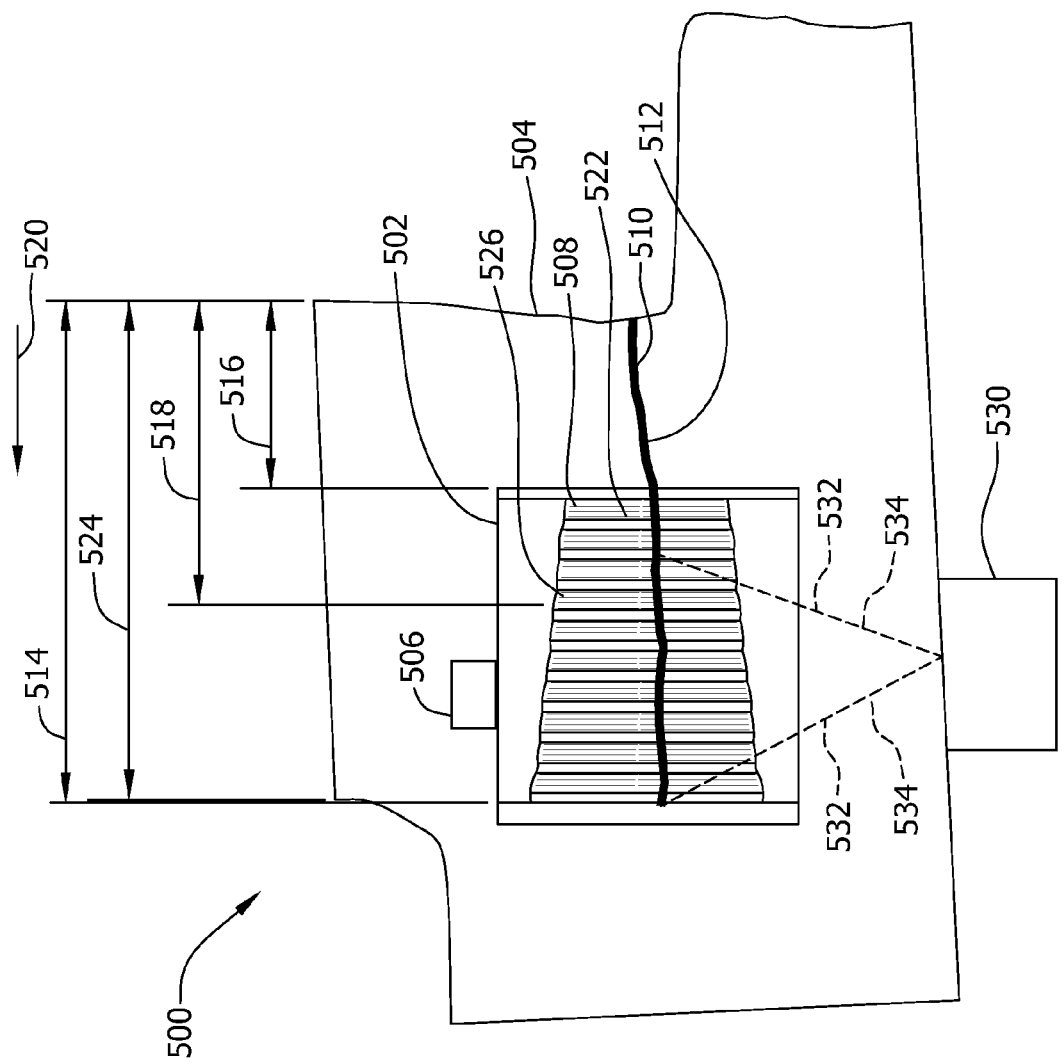
FIG. 7 is an enlarged view of an alternative structural health monitoring system suitable for use with the wind turbine generator system shown in FIG. 1.

FIG. 7 is an enlarged view of an alternative structural health monitoring system 500 for use with wind turbine generator system 10. In the alternative embodiment, structural health monitoring system 500 includes a resistance sensor 502 coupled to a structural component 504 of wind turbine generator system 10, such as generator support assembly 50, tower 12, and/or nacelle 16 (shown in FIG. 2). A power generator 506 is coupled to resistance sensor 502 for providing a power voltage to resistance sensor 502. Resistance sensor 502 includes at least one resistance bar 508 aligned across a structural discontinuity 510 formed within structural component 504. In one embodiment, resistance sensor 502 includes a plurality of resistance bars 508 that each include a resistance value that is different from the resistance value of an adjacent resistance bar 508. In the alternative embodiment, resistance sensor 502 is coupled to structural component 504 such that at least a portion of resistance sensor 502 covers structural discontinuity 510. In one embodiment, structural discontinuity 510 is a structural crack 512 having a length 514. For example, during operation of wind turbine generator system 10, structural crack 512 may increase in length from a first length 516 to a second length 518 in a first direction 520 across structural component 504. Resistance sensor 502 is positioned over structural crack 512 such that a first resistance bar 522 is positioned adjacent to first length 516 and aligned with respect to first direction 520, such as substantially perpendicular to first direction 520. As structural crack 512 increases in length from first length 516 to second length 518, structural crack 512 extends across a first resistance bar 522 and separates first resistance bar 522 into at least two segments. As first resistance bar 522 separates, an overall resistance across resistance sensor 502 is increased from a first resistance to a second resistance, and resistance sensor 502 transmits a signal to controller 302 that is indicative of the change in the overall resistance. As structural crack 512 increases in length from second length 518 to a third length 524, for example, structural crack 512 further extends across a second resistance bar 526 and causes second resistance bar 526 to separate into at least two segments. As second resistance bar 526 separates, the overall resistance across resistance sensor 502 is increase from a second resistance to third resistance, and resistance sensor 502 transmits a signal indicative of the change in the overall resistance across resistance sensor 502. In one embodiment, each adjacent resistance bar 508 along direction 520 includes a step-wise increase in resistance such that as each resistance bar 508 is separated by structural crack 512, the resistance value across resistance sensor 502 increases. In another alternative embodiment, each adjacent resistance bar 508 along direction 520 includes a step-wise decrease in resistance such that as each resistance bar 508 is separated, the resistance value across resistance sensor 502 decreases.

In the alternative embodiment, controller 302 is configured to receive signals indicative of length 514, such as first length 516, second length 518, or third length 524, of structural discontinuity 510 from resistance sensor 502, and is configured to associate a structural discontinuity length value with each received signal. Controller 302 is further configured to calculate a structural health of wind turbine generator system 10 based on structural discontinuity length 514 and to compare the calculated structural health with a predefined structural health of wind turbine generator system 10. In the alternative embodiment, controller 302 is configured to transmit the second notification signal to user computing device 104 upon determining that the sensed structural discontinuity length 514 is longer than the predefined structural discontinuity length. In one embodiment, controller 302 is configured to control pitch drive system 68 to move rotor blade 22 to a feathered position to slow a rotation of rotor 18 upon determining that the sensed structural discontinuity length 514 is longer than the predefined structural discontinuity length.

In one embodiment, resistance sensor 502 is configured to transmit a first signal indicative of first length 516 and to transmit a second signal indicative of second length 518 to controller 302. Controller 302 is configured to calculate a period of time between receiving the first signal and the second signal. Controller 302 is further configured to calculate a rate of expansion of the structural discontinuity equal to the difference between the first length and the second length divided by the calculated period of time. Controller 302 is further configured to determine the structural health of wind turbine generator system 10 based on the calculated rate of expansion and to compare the calculated structural health with a predefined structural health of wind turbine generator system 10. In an alternative embodiment, controller 302 is configured to control pitch drive system 68 to move rotor blade 22 to a feathered position upon determining that the calculated rate of expansion is greater than a predefined rate of expansion.

In one embodiment, structural health monitoring system 500 includes an ultrasonic sensor 530 coupled to structural component 504. Ultrasonic sensor 530 is configured to transmit at least one signal or high frequency sound wave 532 into structural component 504 towards structural crack 512, and to receive at least one return sound wave or echo 534 reflected from structural crack 512. Ultrasonic sensor 530 is further configured to calculate a time interval between sending high frequency sound wave 532 and receiving echo 534, and transmit a signal indicative of the time interval to controller 302. Controller 302 is configured to determine a length of structural crack 512 based on the signal received from ultrasonic sensor 530.

FIG. 8 is a flow chart of an exemplary method 600 of operating structural health monitoring system 24. In the exemplary embodiment, method 600 includes transmitting 602, by sensor 56, at least one first monitoring signal indicative of a structural discontinuity to structural health monitoring controller 302. Controller 302 calculates 604 a structural health of wind turbine generator system 10 based on the first monitoring signal, and compares 606 the calculated structural health with a predefined structural health. Controller 302 transmits 608 a first notification signal to user computing device 104 upon receiving a signal indicative of the structural discontinuity. Controller 302 further transmits 610 a second notification signal to user computing device 104 upon determining 612 that the structural health of wind turbine generator system 10 is less than a predefined structural health. In one embodiment, controller 302 operates 614 pitch drive system 68 to rotate rotor blade 22 to a feathered position to slow a rotation of rotor 18 upon determining 612 that the structural health of wind turbine generator system 10 is less than a predefined structural health.

An exemplary technical effect of the methods, system, and apparatus described herein includes at least one of: (a) transmitting, from a sensor to a controller, at least one monitoring signal indicative of a structural discontinuity; (b) calculating, by a computing device, a structural health of a wind turbine based on the monitoring signal; (c) comparing the calculated structural health with a predefined structural health; (d) transmitting a first notification signal from the controller to a remote device upon receiving a signal indicative of the structural discontinuity; (e) transmitting a second notification signal from the controller to the remote device upon determining the structural health is less than a predefined structural health; and (f) operating a pitch drive system to rotate a rotor blade to a feathered position upon determining the health of the structural component is less than a predefined structural health.

The above-described systems and methods facilitate monitoring the structural health of a wind turbine. More specifically, a structural health monitoring system facilitates sensing one or more structural discontinuities within components of the wind turbine and determining the health of the wind turbine based on the one or more structural discontinuities. Further, the system described herein operates the wind turbine in a safety operation upon determining that the health of the wind turbine system is different than a predefined structural health. As such, the damage that can occur to a wind turbine during operation is facilitated to be reduced or eliminated, thereby extending the operational life of a wind turbine.

Exemplary embodiments of systems and methods for monitoring a structural health of a wind turbine are described above in detail. The systems and methods are not limited to the specific embodiments described herein, but rather, components of the systems and/or steps of the methods may be utilized independently and separately from other components and/or steps described herein. For example, the methods may also be used in combination with turbine monitoring systems, and are not limited to practice with only the wind turbine systems as described herein. Rather, the exemplary embodiment can be implemented and utilized in connection with many other turbine monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a structural health of a wind turbine, said method comprising:
    transmitting, from a sensor to a controller, at least one monitoring signal indicative of a structural discontinuity, the sensor operatively coupled to a structural component of the wind turbine; and,
    transmitting a first notification signal from the controller to a user computing device upon receiving the monitoring signal;
    calculating, by the controller, a structural health of the wind turbine based on the monitoring signal; and,
    transmitting a second notification signal from the controller to the user computing device upon determining that the calculated structural health is less than a predefined structural health.

2. A method in accordance with claim 1, wherein the wind turbine includes at least one rotor blade coupled to a pitch drive system, said method further comprising operating the pitch drive system to rotate the rotor blade to a feathered position upon determining that the calculated structural health is less than the predefined structural health.

3. A method in accordance with claim 1, wherein the monitoring signal is indicative of a length of the structural discontinuity, said method further comprising:
    comparing the length of the structural discontinuity with a predefined length; and,
    transmitting a second notification signal from the controller to the user computing device upon determining that the length of the structural discontinuity is greater than the predefined length.

4. A method in accordance with claim 3, wherein the wind turbine includes at least one rotor blade coupled to a pitch drive system, said method further comprising operating the pitch drive system to rotate the rotor blade upon determining that the length of the structural discontinuity is greater than the predefined length.

5. A method in accordance with claim 1, further comprising:
    transmitting, from the sensor to the controller, a first signal indicative of a first length of the structural discontinuity and a second signal indicative of a second length of the structural discontinuity;
    calculating, by the controller, a rate of expansion of the structural discontinuity based on the first length, the second length, and a period of time between receiving the first signal and receiving the second signal; and,
    transmitting a second notification signal from the controller to the user computing device upon determining that the calculated rate of expansion is greater than a predefined rate of expansion.

6. A structural health monitoring system for use with a wind turbine, said structural health monitoring system comprising:
    at least one sensor mountable with respect to a structural component of the wind turbine and configured to sense a structural discontinuity formed within the structural component, said sensor further configured to transmit at least one monitoring signal indicative of the structural discontinuity; and,
    a controller communicatively coupled to said sensor for receiving the monitoring signal from said sensor, said controller configured to:
        determine a structural health of the wind turbine based on the received signal;
        transmit a first notification signal to a user computing device upon receiving the monitoring signal; and,
        transmit a second notification signal to the user computing device upon determining that the structural health is less than a predefined structural health.

7. A structural health monitoring system in accordance with claim 6, wherein the structural discontinuity has a length, said sensor configured to transmit a signal indicative of the structural discontinuity length, and said controller configured to transmit a second notification signal to said user computing device upon determining that the structural discontinuity length is greater than a predefined length.

8. A structural health monitoring system in accordance with claim 7, wherein said wind turbine includes at least one rotor blade coupled to a pitch drive system, said controller configured to operate the pitch drive system to rotate the rotor blade upon determining that the structural discontinuity length is greater than a predefined length.

9. A structural health monitoring system in accordance with claim 6, wherein said wind turbine includes at least one rotor blade coupled to a pitch drive system, said controller configured to operate the pitch drive system to rotate the rotor blade upon determining that the structural health is less than a predefined structural health.

10. A structural health monitoring system in accordance with claim 6, wherein said sensor comprises one of an ultrasonic sensor and a resistance sensor.

11. A structural health monitoring system in accordance with claim 6, wherein the structural discontinuity increases from a first length to a second length, said sensor configured to transmit a first signal indicative of the first length and a second signal indicative of the second length, said controller is configured to:
    calculate a rate of expansion of the structural discontinuity based on the first length, the second length, and a period of time between receiving the first signal and receiving the second signal; and,
    determine the structural health of the wind turbine is less than a predefined structural health when the calculated rate of expansion is greater than a predefined rate of expansion.

12. A structural health monitoring system in accordance with claim 6, wherein said sensor is mounted with respect to at least one of a generator frame and a tower of the wind turbine.

13. A wind turbine, comprising:
    a tower;
    a nacelle coupled to said tower;
    a generator positioned within said nacelle;

a rotor rotatably coupled to said generator; and,
a structural health monitoring system operatively coupled to a structural component of said wind turbine, said structural health monitoring system comprising:
at least one sensor coupled to the structural component, said sensor configured to sense a structural discontinuity formed within the structural component and transmit at least one monitoring signal indicative of the structural discontinuity; and,
a controller communicatively coupled to said sensor for receiving the monitoring signal from said sensor, said controller configured to:
determine a structural health of the wind turbine based on the received signal;
transmit a first notification signal to a user computing device upon receiving the first signal; and,
transmit a second notification signal to the user computing device upon determining that the structural health is less than a predefined structural health.

14. A wind turbine in accordance with claim 13, wherein said sensor is operatively coupled to a generator frame of said wind turbine.

15. A wind turbine in accordance with claim 13, wherein said sensor is operatively coupled to the tower of said wind turbine.

16. A wind turbine in accordance with claim 13, further comprising at least one rotor blade coupled to a pitch drive system, wherein the structural discontinuity has a length, said controller configured to operate said pitch drive system to rotate said rotor blade upon determining that the length of the structural discontinuity is greater than a predefined length.

* * * * *